United States Patent [19]

Kausel

[11] Patent Number: 5,629,931
[45] Date of Patent: May 13, 1997

[54] INFORMATION TRANSMISSION SYSTEM

[75] Inventor: Wilfried Kausel, Vienna, Austria

[73] Assignee: Semcotec Handelsgesellschaft m.b.H., Vienna, Austria

[21] Appl. No.: 428,147

[22] PCT Filed: Oct. 27, 1993

[86] PCT No.: PCT/AT93/00165

§ 371 Date: Jun. 1, 1995

§ 102(e) Date: Jun. 1, 1995

[87] PCT Pub. No.: WO94/10809

PCT Pub. Date: May 11, 1994

[30] Foreign Application Priority Data

Oct. 27, 1992 [AT] Austria ................... 2123/92

[51] Int. Cl.⁶ .............. H04J 3/18; H04M 11/06; H04M 19/08

[52] U.S. Cl. ............ 370/241; 370/521; 370/524; 379/1; 379/106

[58] Field of Search ................ 370/58.1, 58.2, 370/58.3, 109, 110.1

[56] References Cited

FOREIGN PATENT DOCUMENTS

WO-A1 91/20 141  12/1991  WIPO.

OTHER PUBLICATIONS

NTG-Fachberichte, vol. 64: New Developments in Telecommunications, delivered at the NTG Conference of Apr. 17–19, 1978, pp. 64–68.

*Primary Examiner*—Melvin Marcelo
*Attorney, Agent, or Firm*—Henry M. Feiereisen

[57] ABSTRACT

In an information transmission system, in particular a telephone system, the subscribers can be connected to a dial exchange over a line. At the dial exchange end and at the subscriber end of the line are connected bidirectional multiplexers or demultiplexers over a bidirectional modem circuit which modulates and demodulates the data according to the intended transmission. If required, bidirectional compressor and decompressor circuit are connected to the multiplexers and demultiplexers, to which the subscribers are connected through a forward and a backward channel and a SLAC (bidirectional analog-digital converter (CODEC) with subscriber interface circuits (SLIC)), or to which a relaying device of the dial exchange is connected through drive circuits. In order to allow fault finding to be carried out in a simple manner in such a system, a measuring, regulating or controlling circuit (33, 34, 36, 37, 38) is arranged between each subscriber (1) and their allocated CODEC, SLIC or SLAC (2) or is at least partially integrated into the CODEC, SLIC, SLAC.

12 Claims, 12 Drawing Sheets

INFORMATION TRANSMISSION SYSTEM

The invention is directed to an information transmission system, in particular a telephone system, in which subscribers can be connected with a central office via a line, a bidirectional multiplexer and demultiplexer, respectively, being connected at the central office end and at the subscriber end of the line via a modem circuit which is likewise bidirectional and which modulates and demodulates data corresponding to the intended transmission, and in which a bidirectional compressor circuit and decompressor circuit are connected to the multiplexer and demultiplexer, respectively, to which the subscribers are connected, as the case may be, via a forward channel and reverse channel and at least one bidirectional analog-to-digital converter (CODEC), preferably a SLAC (bidirectional analog-to-digital converter (CODEC) with subscriber interface circuits (SLIC)), and to which switching equipment of the central office is connected via control circuits.

A system of this type is known from WO 91/20141. In such systems, problems arise in locating errors. In these systems, error diagnosis on the subscriber lines is restricted to very specific individual cases such as monitoring of ringing current thresholds, detection of short circuits and the like. In many cases, relays are used to connect at least preferred subscribers with the central office electrically in the event of errors. In all cases, conversion of telephone systems with direct connection of the subscriber to a central office line, e.g., via two-motion selectors, to the system mentioned above drastically limits maintenance and error diagnosis possibilities on the central office side.

The object of the present invention is to overcome these disadvantages and to provide an information transmission system of the type mentioned above which possesses good diagnostic possibilities.

According to the invention, this is achieved in that a measuring circuit, regulating circuit or control circuit is arranged between every subscriber (1) and the CODEC, SLIC or SLAC (2) associated with the subscriber or is at least partially integrated with the CODEC, SLIC or SLAC (2).

In this way it is possible to monitor the lines leading to the subscriber which could not previously be detected from the central office side in the information transmission systems mentioned above.

These measuring, regulating and control circuits which can be used for measurements and diagnostic functions and installed in an integrated subscriber circuit without great cost can detect leakage currents in the subscriber lines when the subscriber set is hung up, i.e., the leads relative to one another and to ground, the line resistance when the handset is off the hook, the ringing current and the impedance when the handset is hung up, the symmetry, differential voltages, differential currents, as well as the call charge pulses, synchronization current, the longitudinal alternating current, proper functioning of line safety elements and lightening protection elements and the ambient temperature.

According to a further feature, controllable switches are connected to the lines leading to the subscribers to enable a signal connection between the forward channel and the reverse channel of the same partial channel or, in multichannel solutions, e.g., of another partial channel.

In this way, it is possible, proceeding from the central office, to listen in to or speak on another connection for testing purposes while conversations are in progress, to follow voltage signals or current signals to different points of the transmission path or to effect stimulation at these points in a purposeful manner. The transmission of the corresponding values is made possible by the broad band of the voice channel and maintenance channel.

Further, a coupler connected to the forward channel and reverse channel, preferably a transformer with an isolating capacitor, can be arranged at the subscriber side of every SLAC and connected with the regulating circuit which is connected with a comparison circuit, e.g., a differential circuit, a comparator or the like, which compares the reference direct current with the actual direct current detected in the SLAC.

Accordingly, it is possible to superpose the signal alternating voltage and the supply DC voltage in a simple manner.

Further, the regulating circuit can comprise a circuit which detects the sign of the output signal of the comparator connected upstream, a digital integrator connected downstream of the latter, a digital filter and a digital-to-analog converter.

Most of the necessary measurements may be obtained in this way.

A current meter and voltage meter can also be integrated in every SLAC.

In this way, the most important measurement data can be detected in a very simple manner and conveyed to the central office.

The invention is explained more fully with reference to the drawings.

Figure 1:
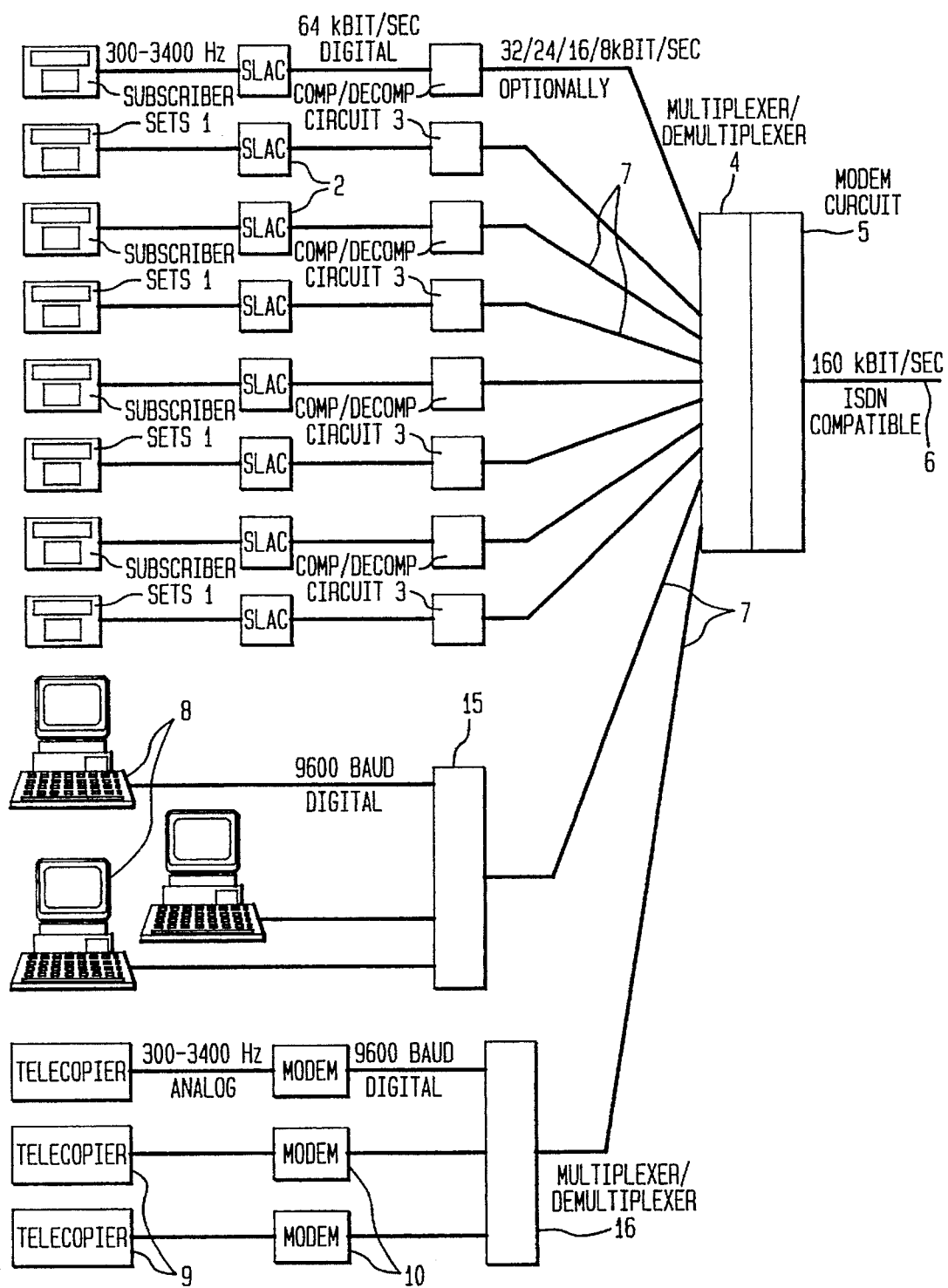
FIG. 1 shows the subscriber side of an information transmission system according to the invention.

According to FIG. 1, subscriber sets 1 are connected with SLACs (bidirectional analog-to-digital converters 2 with subscriber interface circuits) in which the analog signals coming from the subscriber sets 1, which generally have a frequency range of 300 Hz to 3400 Hz, are converted into digital signals on the one hand and the digital signals 1 coming from bidirectional compressor/decompressor circuits 3 connected with the SLACs 2 are converted into analog signals which are fed to the subscriber sets 1.

In so doing, the SLACs 2 supply digital signals which are transmitted to the corresponding compressor/decompressor circuit 3, e.g., at a transmission rate of 64 Kbits/sec.

These compressor/decompressor circuits 3 operate in a bidirectional manner insofar as they compress the signals coming from the SLACs 2 and decompress the compressed digital signals coming from the multiplexer 4 and then transmit them to the SLACs 2.

The bidirectional compressor/decompressor circuits 3 compress the signals arriving from the SLACs 2 at a rate of 64 Kbits/sec to 32 Kbits/sec, 24 or 16 Kbits/sec, depending on the compression algorithm or quality requirements. Decompression is effected correspondingly in the reverse manner.

The multiplexer/demultiplexer 4 likewise works bidirectionally in that it forms a signal from the signals coming from the subscribers in multiplexing operation on the one hand and on the other hand, in demultiplexing operation, distributes the signals coming from line 6 or from the modem circuit 5 connected therewith to the individual connection lines 7. In addition to the voice and transmission data, switching information such as dialing pulses, call charge pulses and direct-dialing pulses are also transmitted via line 6.

In addition to the subscriber sets 1, three computers 8 and three telecopiers 9 are also connected to the bidirectional multiplexer/demultiplexer 4 via a bidirectional multiplexer/demultiplexer 15. A neutralization modem 10 which cancels the action of the output modem installed in the telecopiers 9 is connected to the output of every telecopier 9. These three telecopiers are connected to the main multiplexer/demultiplexer 4 via a bidirectional multiplexer/demultiplexer 16.

Figure 2:
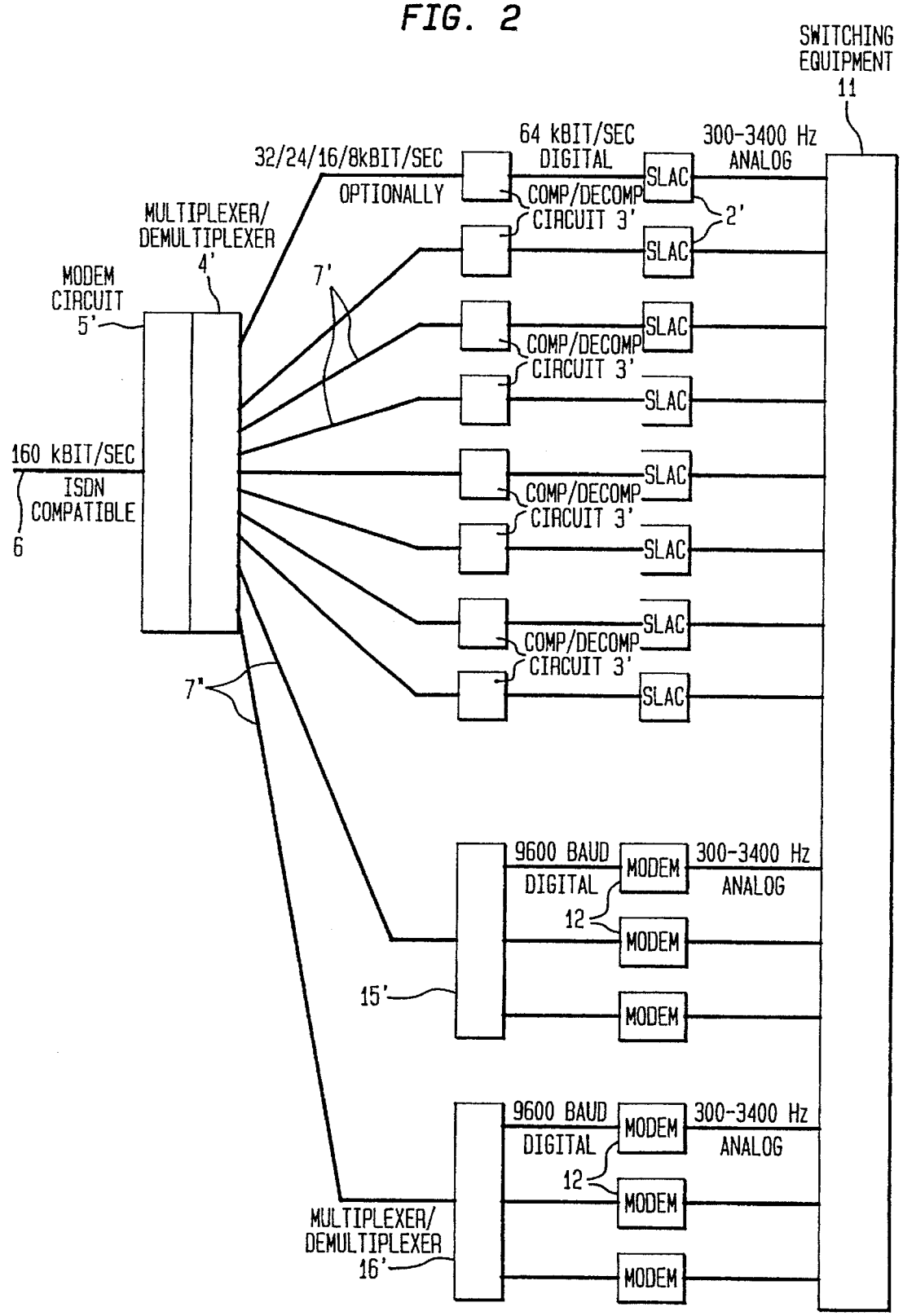
FIG. 2 shows the respective central office side with a central office with analog connections.
Figure 3:
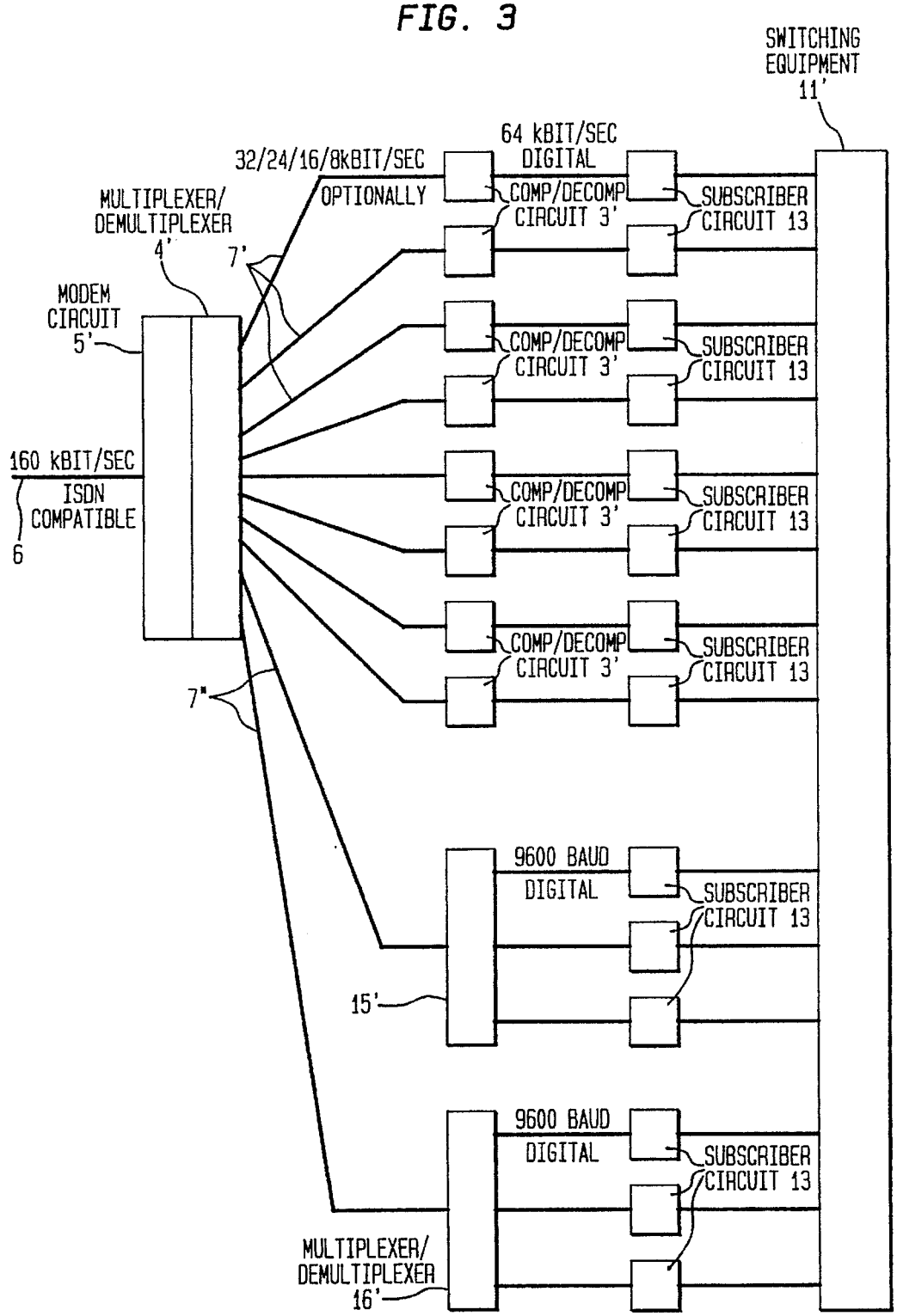
FIG. 3 shows the respective central office side with a central office with digital connections.

As can be seen from FIGS. 2 and 3, a modem circuit 5' is connected on the central office side to line 6. Modem circuits 5, 5' provide for the modulation and demodulation required for transmitting the compressed and processed signals. If the system operates according to the CCITT standard, the data format on line 6 can correspond to the standard for the ISDN-U bus interface specified by CCITT.

The modem circuit 5' is connected with a bidirectional multiplexer/demultiplexer 4' which is connected via a portion of its output lines 7' with bidirectional compressor/decompressor circuits 3'.

In the case of switching equipment 11 with analog signal control, the compressor/decompressor circuits 3' are connected with SLACs 2' which are connected in turn with the switching equipment 11 and control the latter by analog signals.

According to FIG. 2 and other figures, additional output lines 7'' are connected, via an additional bidirectional multiplexer/demultiplexer 15' associated with the data lines of the computers 8 and via another bidirectional multiplexer/demultiplexer 16' associated with the data lines of the telecopiers 9, with modems 12 which are connected upstream of the switching equipment 11 with analog signal control and convert the digital signals coming from line 6 into analog signals.

In switching equipment 11' with digital signal control, as is shown in FIG. 3, the compressor/decompressor circuits 3' are connected with subscriber circuits 13 at whose outputs are formed digital signals. These subscriber circuits can take the form of plug-in cards conventionally used in digital switching centers, but are modified in that they have no A/D converter. The output line 7'' of the bidirectional main multiplexer/demultiplexer 4' associated with the computers 8 is connected to a bidirectional multiplexer/demultiplexer 15 and an output line 7'' associated with the telecopiers 9 is connected to a bidirectional multiplexer/demultiplexer 16'. The outputs of this multiplexer/demultiplexer 15', 16' are connected directly to the subscriber circuits 13 which enable the arriving digital signals to be adapted to the requirements of the switching equipment 11'.

Alternatively, the main multiplexer/demultiplexer 4, 4' can also be designed in such a way that the multiplexer/demultiplexers 15, 15' and 16, 16' associated with devices 8 and 9 can be dispensed with and the main multiplexer/demultiplexers 4, 4' take over their function.

Figure 4:
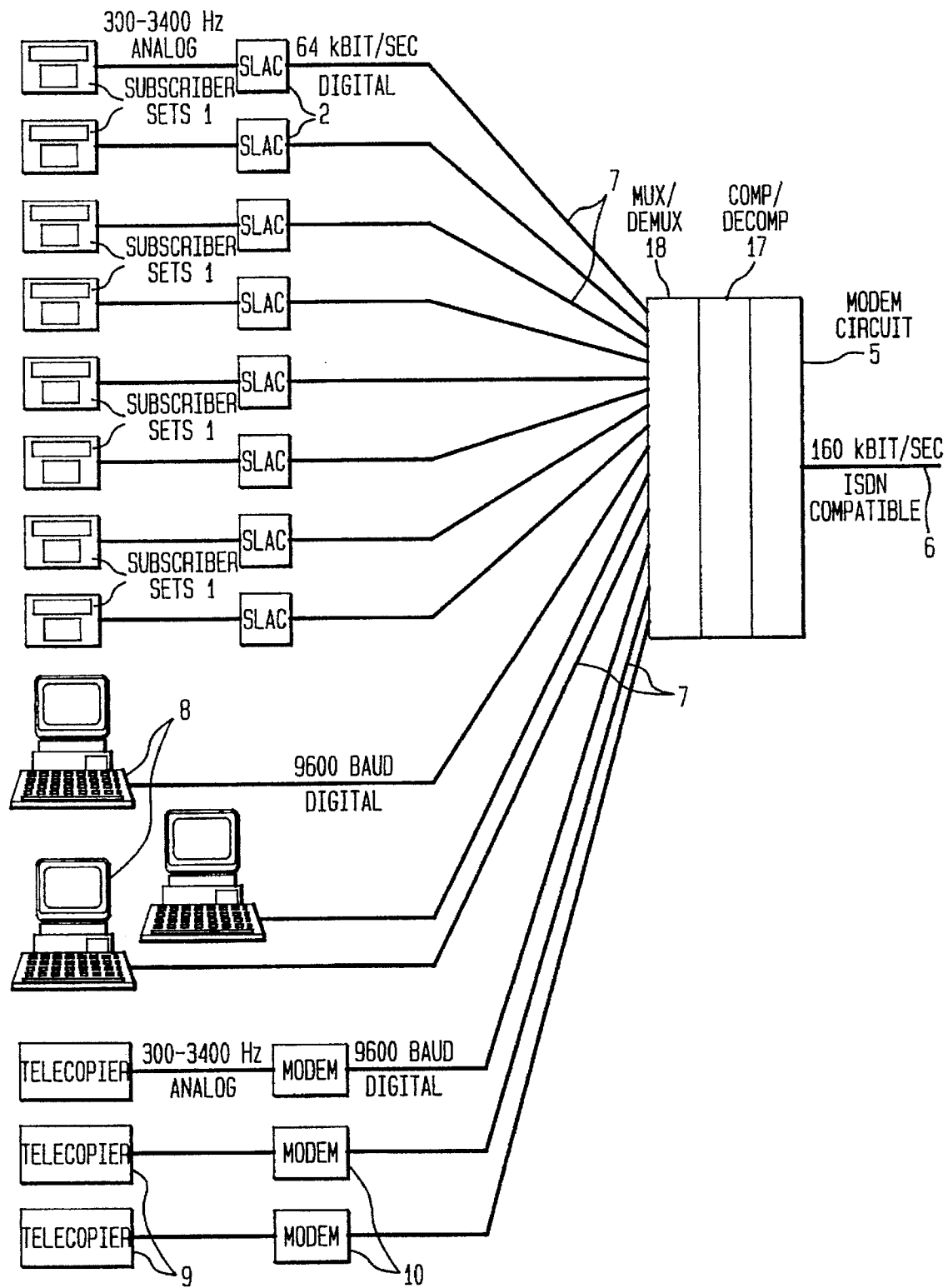
FIG. 4 shows the subscriber side of another information transmission system according to the invention.
Figure 5:
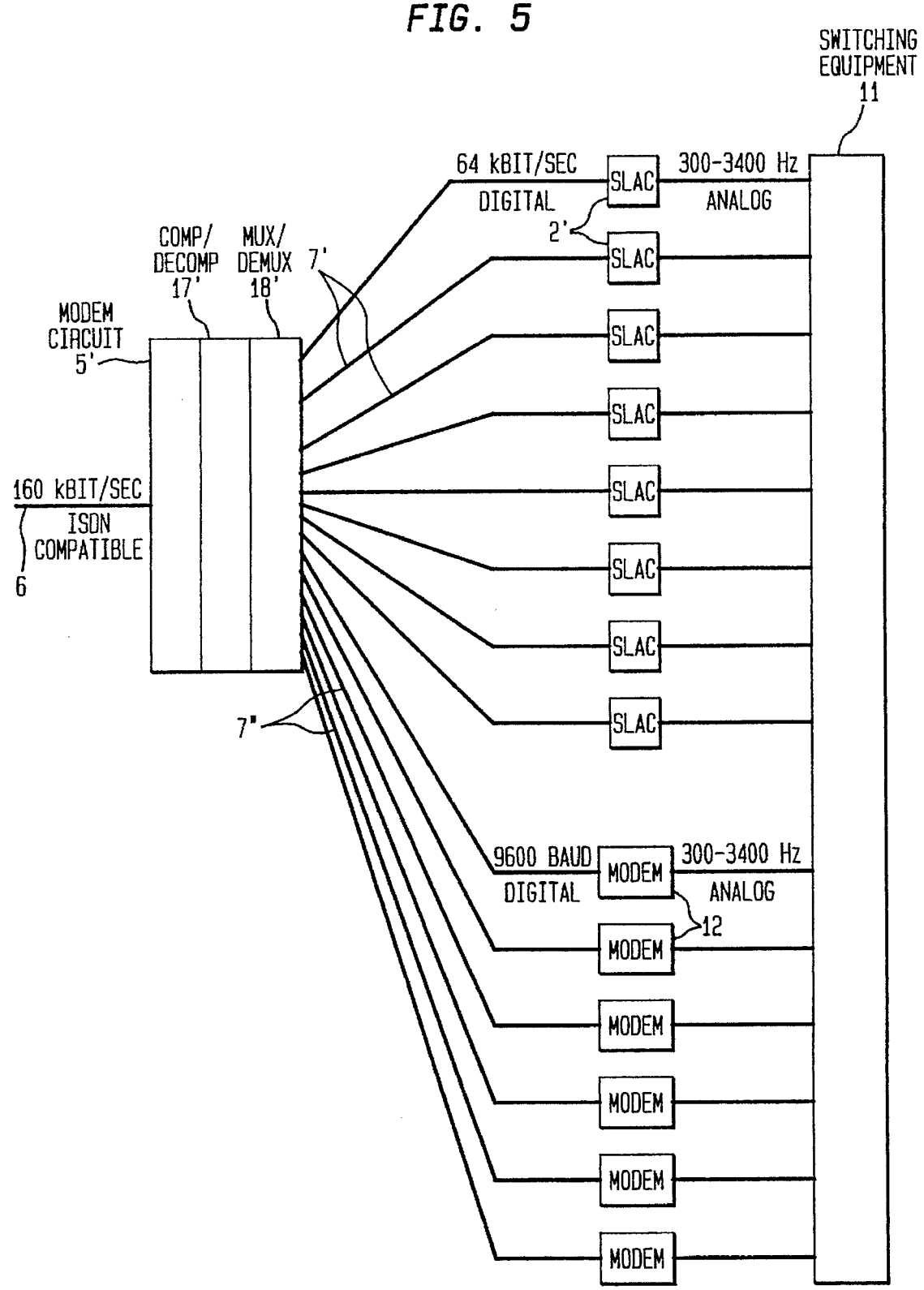
FIG. 5 shows the central office side associated with this other system with a central office with analog connections.
Figure 6:
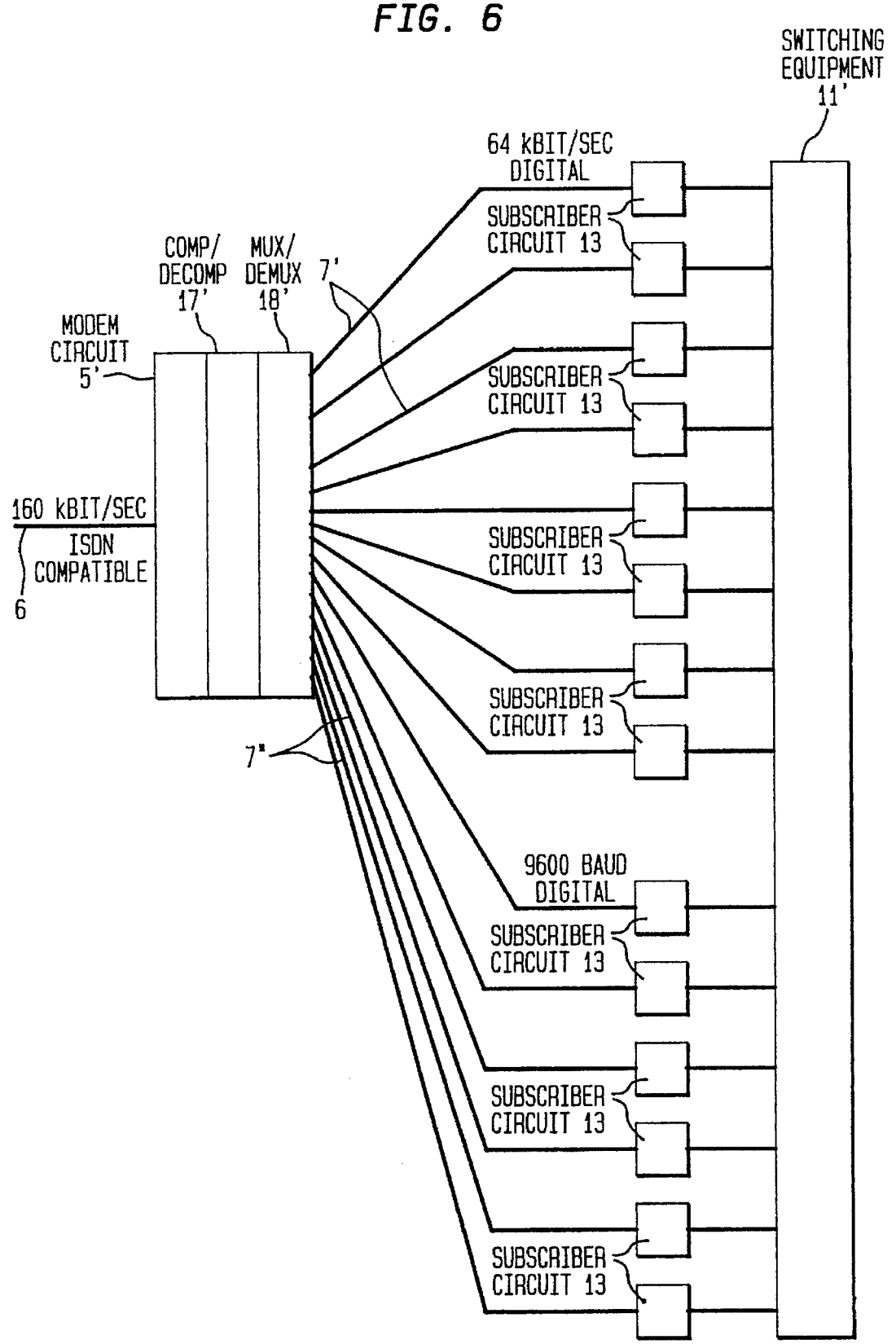
FIG. 6 shows a variant of the construction according to FIG. 5.

The variant of the invention shown in FIGS. 4 to 6 differs from that shown in FIGS. 1 to 3 in that the bidirectional compression/decompression is effected centrally. For this purpose, the outputs of the SLACs 2 are connected directly to the multiplexer/demultiplexer 18 as are the digital data outputs of the computers 8 and the outputs of the modems 10 associated with the telecopier devices 9.

A bidirectional compressor/decompressor circuit 17 is connected to the multiplexer/demultiplexer 18, the input of the modem circuit being connected to its output; line 6 is again connected with the output of the modem circuit.

FIG. 5 shows the central office side of this variant of the invention in a central office with analog signal control and FIG. 6 shows the central office side for a central office with digital signal control. In both cases, FIGS. 5 and 6, the central office end of line 6 is connected to the modem circuit 5', the modem circuit 5' is connected to a bidirectional compressor/decompressor circuit 17' and the bidirectional compressor/decompressor circuit 17' is connected to a bidirectional multiplexer/demultiplexer 18'.

As shown in FIG. 5, the outputs of the multiplexer/demultiplexer 18' corresponding to the voice subscribers are connected, via data lines 7', directly with the SLACs 2' and the outputs of the multiplexer/demultiplexer 18' corresponding to devices 8, 9 are connected directly to the modems 12 via lines 7''.

According to FIG. 6, the data lines 7' and 7'' lead from the multiplexer 18' directly to the subscriber circuits 13 with digital signal output.

The two alternatives of the system according to the invention are alike in other respects as is indicated by identical reference numbers.

The following schematic overview of the operation of the individual circuits identified by reference numbers provides an exact definition of "bidirectional" operation.

| Data Transmission from | Circuits operate as | | | | | |
|---|---|---|---|---|---|---|
| | A/D converter | Compressor | Decompressor | Multi plexer | Demulti plexer | D/A Converter |
| Subscriber To Central Office | 2 | 3, 17 | 3', 17' | 4, 15 16, 18 | 4', 15' 16', 18' | 2', 12 |
| Central Office To Subscriber | 2', 12 | 3', 17' | 3, 17 | 4', 15' 16', 18' | 4, 15 16, 8 | 2 |

FIGS. 7 to 11 show various arrangements of different components at the subscribers.

Figure 7:
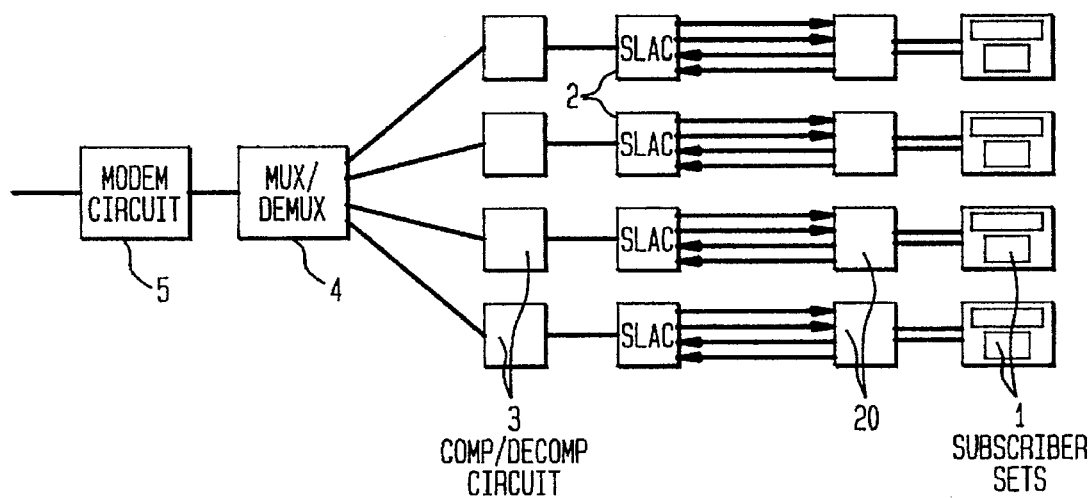
FIGS. 7 to 12 show various possibilities for constructing the subscriber arrangement.

In the arrangement according to FIG. 7, the modem circuit 5 is connected with a multiplexer/demultiplexer 4 which is linked to several compressor/decompressor circuits 3 which in turn are each connected to an analog/digital converter 2. These converters 2 are connected at the output end with interface circuits 20 to which the subscriber sets are linked.

This configuration is of very simple nature, however it has the drawback that relatively complex and expensive components are required.

Figure 8:
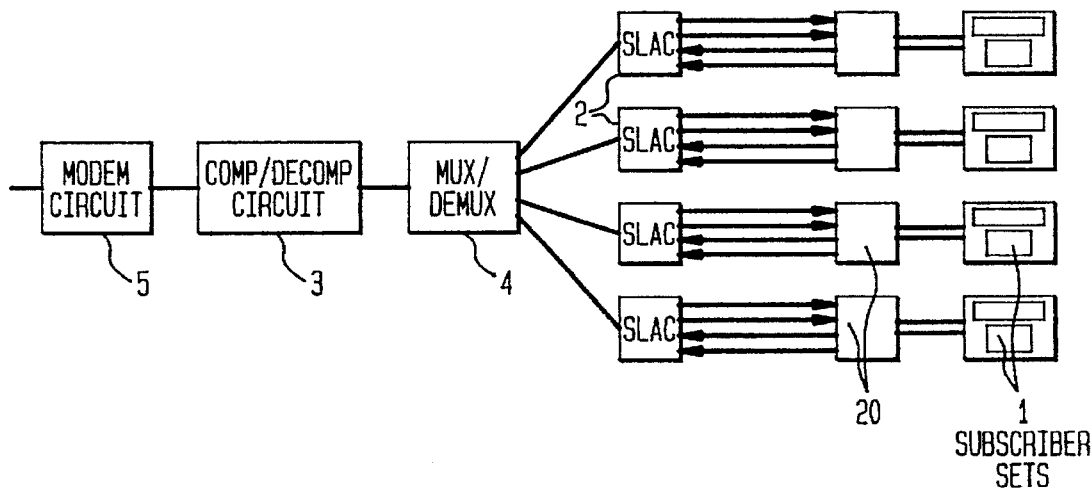

The circuit according to FIG. 8 differs from the one according to FIG. 7 by interposing a compressor/decompressor circuit 3 between the modem circuit 5 and the multiplexer/demultiplexer 4, with the analog/digital converters 2 being linked to the multiplexer/demultiplexer 4.

Figure 9:
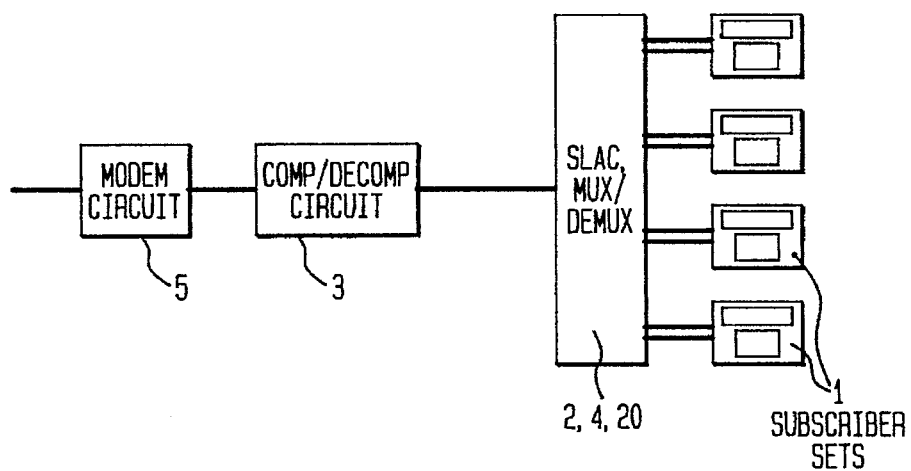

This embodiment results in a very favorable solution because only a very small number of components needs to be used, whereby it is also possible to arrange the converter 2 and the interface circuits 20 as integrated component upon a chip, as indicated in FIG. 9.

Figure 10:
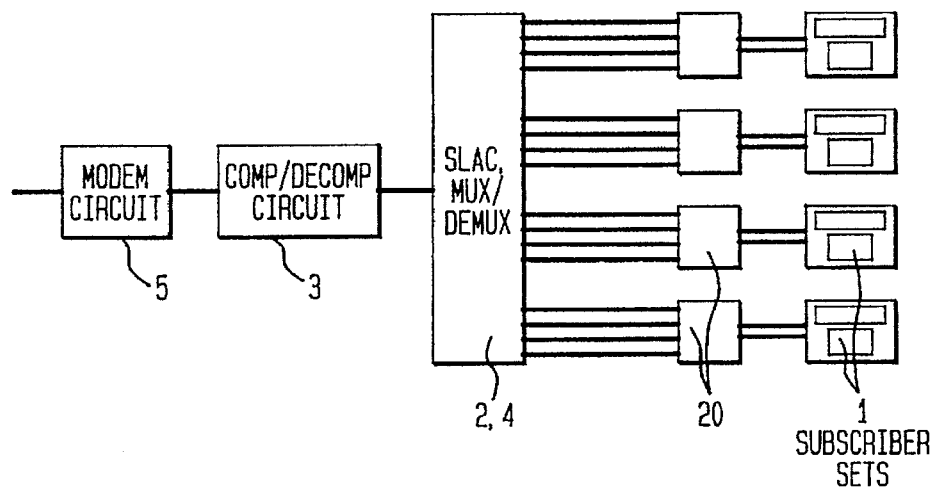

In the embodiment according to FIG. 10, which essentially corresponds to the one according to FIG. 8, the multiplexer/demultiplexer 4 is integrated with the analog/digital converter 2.

Figure 11:
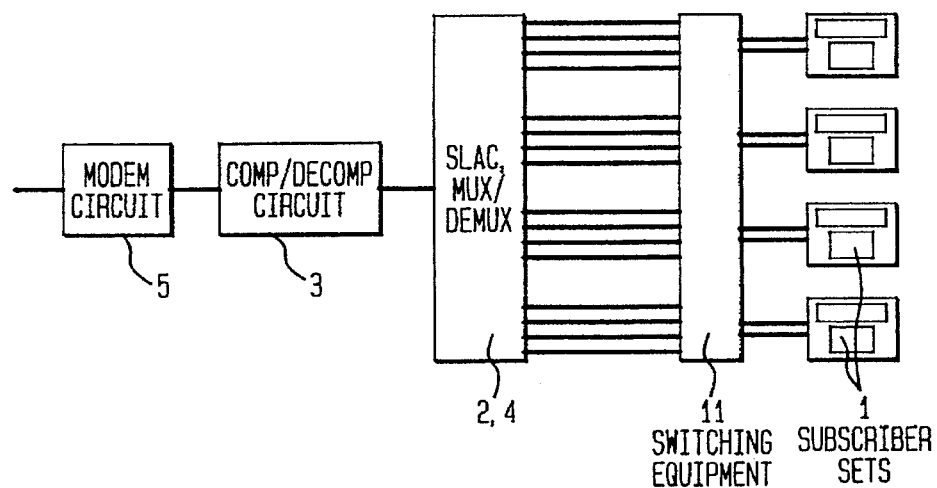

In the embodiment according to FIG. 11, the modem circuit 5 is connected to a compressor/decompressor circuit 3 which is connected to a multiplexer/demultiplexer 4. This multiplexer/demultiplexer 4 is integrated with analog/digital converter 2 and connected with a switching device 11.

Figure 12:
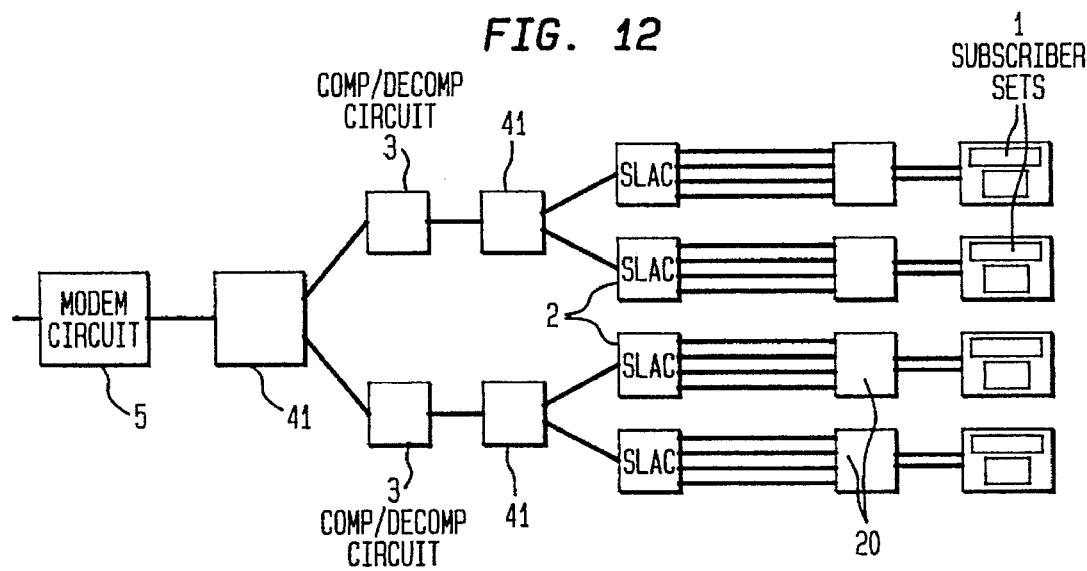

In the embodiment according to FIG. 12, the modem circuit 5 is connected with a two-channel multiplexer/demultiplexer 41 which is connected with two compressor/decompressor circuits 3. The latter are connected to further two channel multiplexer/demultiplexer 41 to which the analog/digital converters 2 are connected which in turn are connected to the interface circuits 20 to which the subscriber sets are linked.

This solution results in a very easy execution of a compression and decompression since mathematically a 2-channel compression is executed in a very simple manner whereupon execution of a 4-channel compression is very cumbersome.

Figure 13:
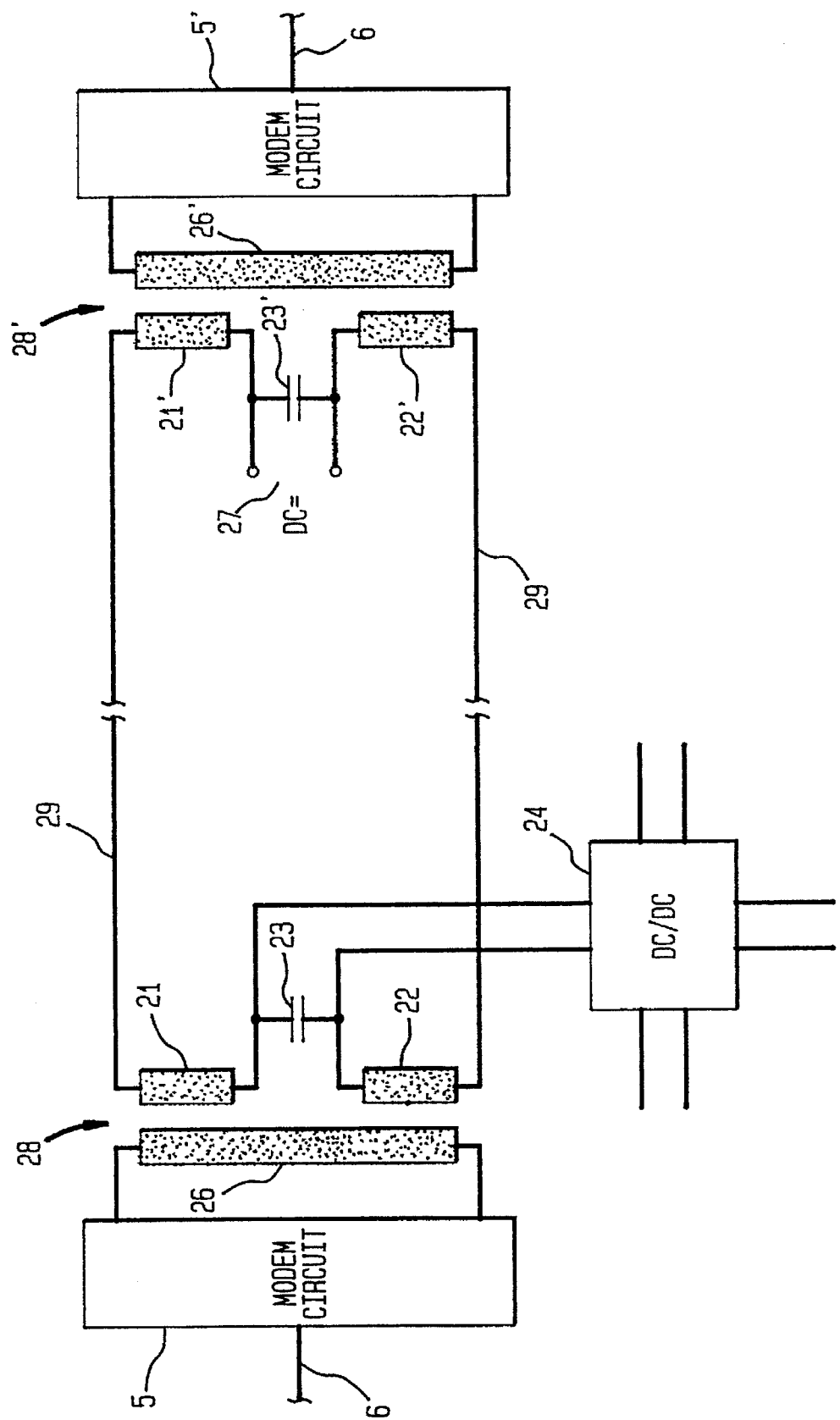
FIG. 13 shows a circuit for the voltage supply to the subscriber.

FIG. 13 shows a circuit for voltage supply of the subscriber circuit, with a transformer 28' being connected to the modem circuit 5' at the central office end and including a primary coil 26' and two secondary coils 21', 22', with both secondary coils being of same configuration and connected together via a condensator 23'. The electrodes of the condensator 23' are thereby connected to a constant voltage source 27.

Connected to the modem circuit 5 on the subscriber end is also a transformer 28 which is of same configuration as the transformer 28'. However, the condensator 23 of the transformer 28 is connected to a dc/dc converter to which the various consumers of the subscriber circuit are connected. The ends of both secondary coils 21, 22, and 21', 22' are thereby connected together via connecting lines 29 so that it becomes possible to transmit via these connecting lines not only signals but also the supply voltage required for operation of the subscriber circuit. Thus, the arrangement of a battery for providing the supply voltage at the subscriber end can be omitted.

Further, it is noted that the invention is not limited to the use of bidirectional compressor/decompressor circuits. For instance, it may also be used on a multiplexing system with two subscribers with a corresponding broad band, also provided for a plurality of subscribers.

Figure 14:
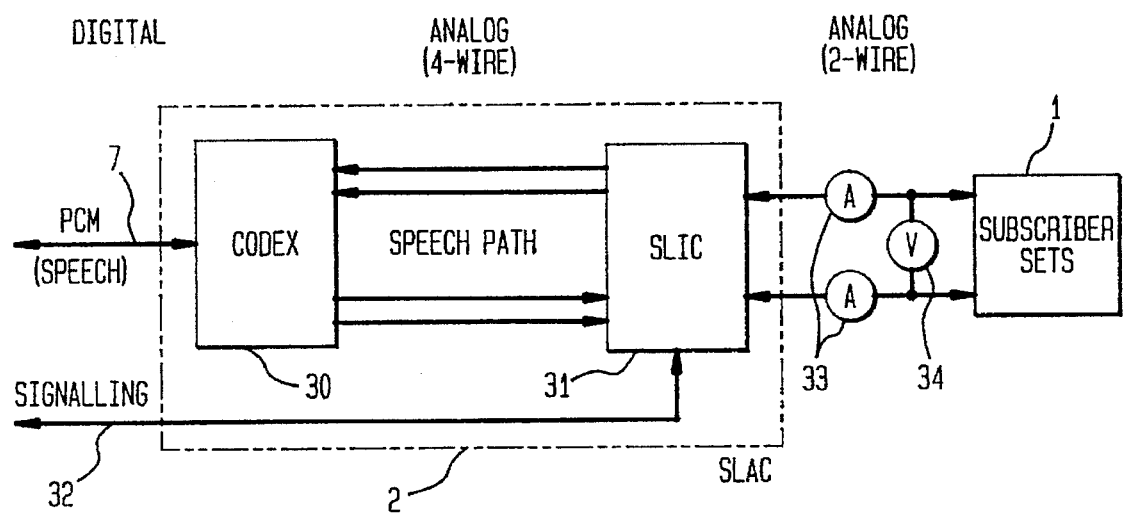
FIG. 14 is a schematic view of a SLAC with connected measurement circuit.

FIG. 14 shows a SLAC 2 (subscriber line connection circuit) in fuller detail. This SLAC 2 has a digital-to-analog converter 30 which is connected with a line 7. Further, the digital-to-analog converter 30 is connected via a four-wire connection with a subscriber interface circuit 31 (SLIC) to which is connected, in addition, a signal line 32. A current meter 33 and, parallel thereto, a voltage meter 34 are arranged in the two lines provided for analog signals, these lines leading to the respective subscriber and serving as forward and reverse channels.

Figure 15:
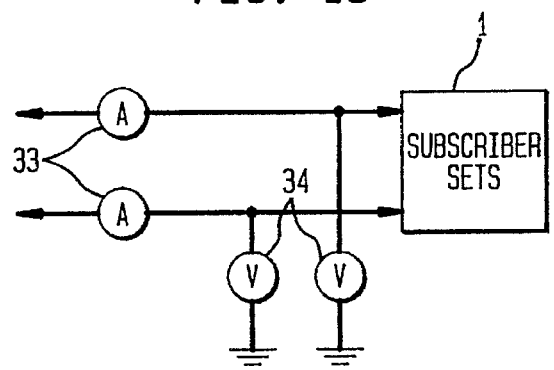
FIG. 15 shows a variant of the connection of the measurement circuit.

The connection variant according to FIG. 15 differs from that shown in FIG. 14 only in that the voltage of the two lines is measured to ground instead of between the two lines.

In principle, it is also possible to make do with only one voltage meter which is switched alternately between the two lines or between a line and ground. In so doing, the current meter and voltage meter can be formed in a very simple manner by resistors.

Figure 16:
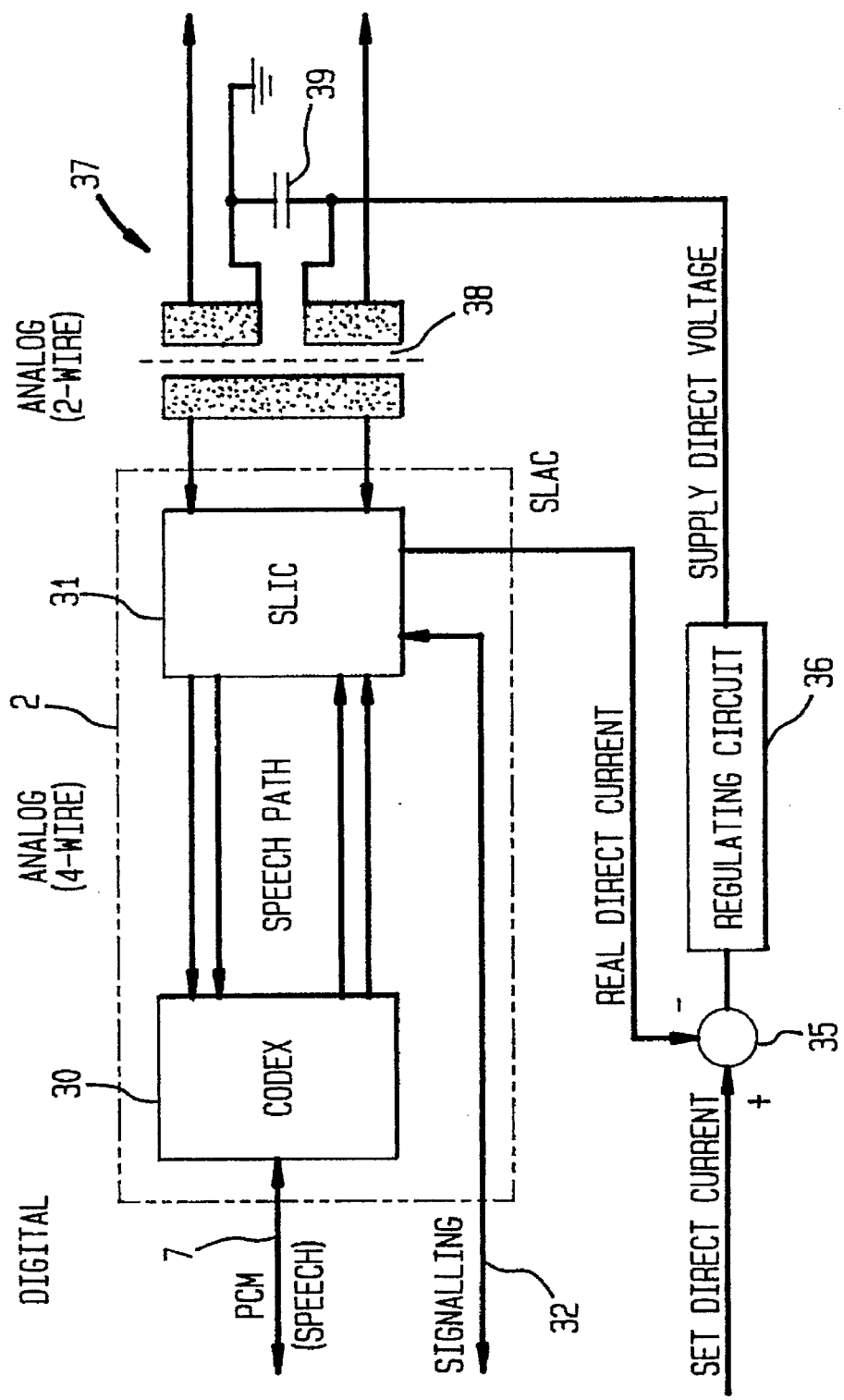
FIG. 16 shows a SLAC with connected regulating circuit.

In the embodiment form according to FIG. 16, in addition to the signal line 32, a comparator 35 is also connected to the subscriber interface circuit 32 so as to provide the latter with actual direct current. Further, this comparator is acted upon by the reference direct current. This comparator 35 is connected on the output side with a regulating circuit 36 which is connected with a coupling circuit 37.

This coupling circuit 37 is formed in the embodiment example shown in the drawing by a transformer 38 and an isolating capacitor 39.

Figure 17:
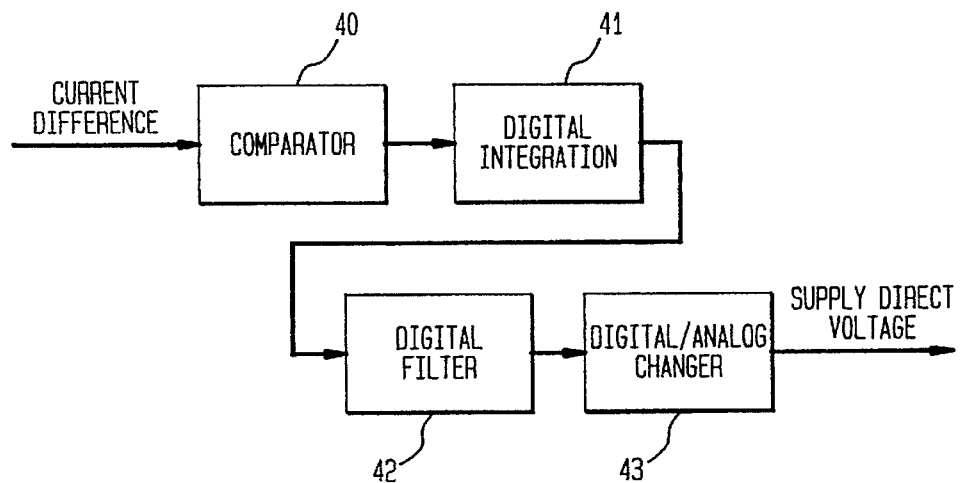
FIG. 17 shows a regulating circuit.

As will be seen from FIG. 17, the regulating circuit 36 is formed by a circuit 40 detecting the sign of the output signal of the comparator, a digital integrator 41 connected downstream of the latter, a digital filter 42 connected downstream of the digital integrator, and a digital-to-analog converter 43 which is connected downstream of the digital filter 42 and whose output signal forms the supply DC voltage for the subscriber.

Figure 18:
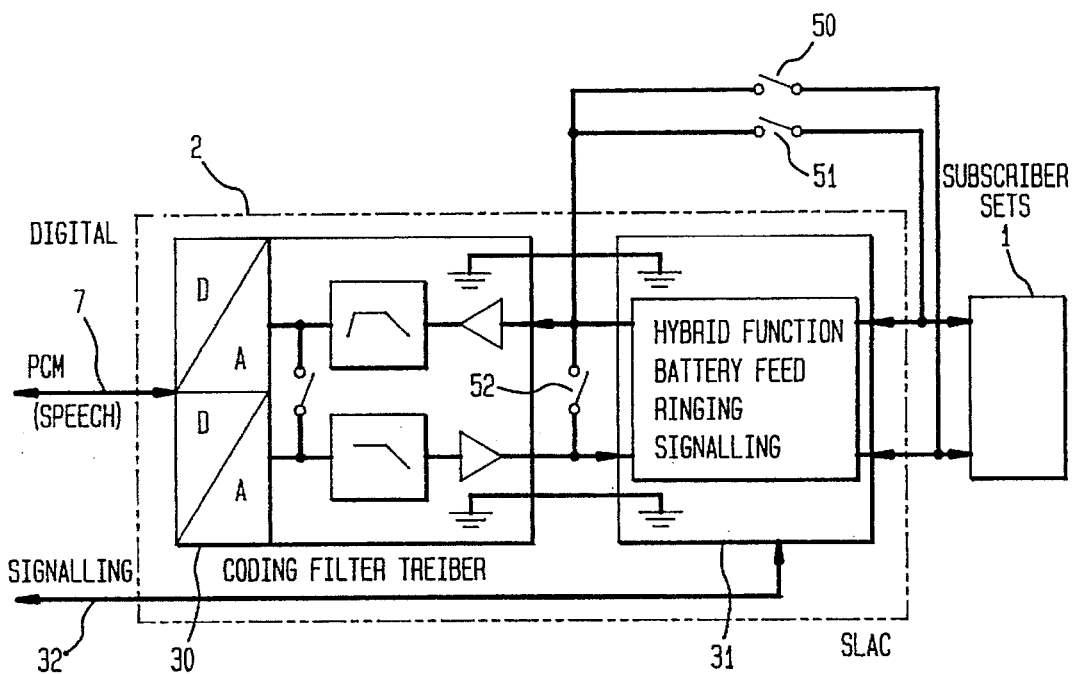
FIG. 18 shows another detail of the invention.

FIG. 18 shows switches 50, 51 which are connected with the lines leading to a subscriber 1 and enable a connection with a voice channel. A switch 52 is provided in addition. The values determined by the measuring circuit, regulating circuit or control circuit (not shown in FIG. 18) can be transmitted to the central office by means of these switches 50 to 52.

In addition to the compressed (3 to 4 subscribers) or uncompressed (2 subscribers) voice information, the signalling information is transmitted digitally via line (6) until the multiplexer/demultiplexer 4 at the other end. The voice data and signalling data are separated again at this end, the voice data are decompressed as the case may be 3' (when there are more than 2 subscribers) and both data are fed to the SLACs 2' or 13 separately. The complementary signalling function with respect to the SLACs 2 takes place in the SLACs 2': While the picking up of the receiver (closing of the fork contact) must be detected in 2, the closing of the contact by a switch (relay or transistor) must be simulated in 2'. While a call charge pulse must be detected in 2', 2 must generate a call charge pulse which is as similar as possible and transmit it to the subscriber 1. Finally, while the telephone of the subscriber must be supplied with power in 2, the same power if possible must be consumed in 2' in order to convey to the central office the simulation of the connection of a telephone.

In the example shown in FIGS. 3 and 6, the digital signalling information and the PCM voice information from the switching group 13 are transmitted directly to the digital switching center. Accordingly, there is no logical connection from the multiplexer/demultiplexer 4' to the switching groups 2' or 13' in FIGS. 2, 3, 5 and 6.

In the same way that the signalling information is transmitted from the SLACs (2 or 2+20) to the switching groups 2' and 13, another path is also provided for the maintenance information. On the ISDN transmission line (6), transmission can be effected at 128 Kbits/sec (=4*32 Kbits or 2*64 Kbits or 2*32 Kbits+64 Kbits corresponding to four compressed, two uncompressed or two compressed and one uncompressed voice channel) plus 32 Kbits/sec for signalling and maintenance (e.g., 16 Kbits/sec+16 Kbits/sec).

Whereas, in subscriber circuits 13, the digital maintenance information can be transmitted directly to the digital switching center, where they must also be evaluated, the switching groups 2' for the maintenance information in the constructions according to FIGS. 1 to 13 constitute the end station. The analog lines between 2' and 11 can transmit speech and signalling, but not the maintenance information. According to the invention, all of the switching groups 2' are digitally connected and an evaluating circuit is connected to this common line. Accordingly, fault finding is not fully integrated in the switching center, but can be carried out very conveniently in the central office. The maintenance information is also transmitted in both directions. While inquiry commands are transmitted in the subscriber direction and switches 50 to 52 are activated by remote or released by remote by means of a self-test, measurements and the results of the self-test are transmitted in the other direction.

According to FIG. 14 or 15, multiple use may be made of existing circuit parts, e.g., the digital-to-analog converter 30 which is provided with a coding device so that the voltage between the described points, and not the voice voltage of the 4-wire line, can be measured and converted from analog to digital in the testing mode. All switching processes in the SLAC 2 can be carried out either via controlled mechanical switches (relays) or via electronic switches 50 to 52 (switching transistors, MOSFETs). In the other signal direction, the converter 30 could also be used to generate test signals which can likewise be injected in various points of the circuit via switches, e.g., in a wire of the two-wire line or in both wires simultaneously.

According to FIG. 16, the circuit contains control loops so as to maintain constant a variable, e.g., supply current. The control loops 36 must detect actual values since comparison with a reference value must be carried out. The controlling variable is often in digital form and a digital-to-analog converter 4a is used to generate the analog signal required in the control loop. The digital value in the regulator is a drop-out product and can be transmitted when required or continuously via the maintenance channel to the central office as a measurement of the plug characteristic, e.g., instantaneous resistance.

For example, a very important control loop might serve for adjustment of the supply direct current for the connected telephone 1. Most of the necessary measurements can be obtained by a few minor modifications, reversible reference current and adjustable regulating time constants. For the sake of simplicity, the superposition of signal alternating voltage and supply DC voltage was realized by a transformer 38 and isolating capacitor 39. However, it could be carried out just as well by a simple series connection of potential-free voltage sources.

The control system is the resistance of the line and subscriber which changes during operation. This resistance results in a current flow which must be continuously compared with the reference current. The comparator 40 is provided for this purpose and continuously determines the sign of the differential. A digital integrator 41 is an up and down counter which is controlled by the sign. The filter circuit 42 determines the regulating time constant. The digital results of the filter 42 are transformed in the digital-to-analog converter 43 into the supply DC voltage for the telephone. The digital value at the input of the digital-to-analog converter 43 is thus always set to the value of the voltage which must be applied to allow the flow of reference current. This voltage divided by the reference current represents the ohmic resistance of the line, including the connected telephone, and need only be transmitted to the central office.

The switches 50 to 52 (FIG. 18) provide loops which are queried by the central office via the maintenance channel and can be activated at various points by means of preferably electronic switches (MOSFETs). As a result, the central office can, for example, listen in or speak on another connection for testing purposes while a conversation is in progress or can follow voltage signals or current signals from various points of the transmission path or can also stimulate these points in a purposeful manner. For evaluating purposes, the loops always require the voice channel in addition to the maintenance channel, since only this voice channel has the necessary bandwidth for transmission. If currents are to be looped back, it is advisable to use current/voltage transformers.

I claim:

1. Information transmission system in which subscribers (1) can be connected with a central office via a line (7), a bidirectional multiplexer and demultiplexer (4, 4'), respectively, being connected at the central office end and at the subscriber end of the line via a modem circuit (5, 5'; 18, 18') which is likewise bidirectional and which modulates and demodulates the data corresponding to the intended transmission, and in which a bidirectional compressor circuit and decompressor circuit (3, 3'; 17, 17') are connectable to the multiplexer and demultiplexer (4, 4'), respectively, to which the subscribers (1) are connected via a forward channel and a reverse channel and at least one bidirectional analog-to-digital converter (CODEC), and to which switching equipment (11) of the central office is connected via control circuits, wherein a circuit circuit (33, 34, 36, 37, 38) is arranged between every subscriber (1) and the CODEC (30) associated with the subscriber (1), and wherein controllable switches (30, 50, 51, 52) are connected to the lines leading to the subscribers (1) so as to enable a signal connection between the forward channel and the reverse channel of the same subscriber, and a signal connection in multichannel solutions to another subscriber.

2. Information transmission system according to claim 1 wherein the bidirectional analog-to-digital converter (CODEC) is a SLAC (2, 2') (bidirectional analog-to-digital converter (CODEC) with subscriber interface circuits (SLIC).

3. Information transmission system according to claim 1 wherein the circuit between every subscriber and the CODEC is at least partially integrated within the CODEC associated with the subscriber (1).

4. Information transmission system in which subscribers (1) can be connected with a central office via a line (7), a bidirectional multiplexer and demultiplexer (4, 4'), respectively, being connected at the central office end and at the subscriber end of the line via a modem circuit (5, 5'; 18, 18') which is likewise bidirectional and which modulates and demodulates the data corresponding to the intended transmission, and in which a bidirectional compressor circuit and decompressor circuit (3, 3'; 17, 17') are connectable to the multiplexer and demultiplexer (4, 4'), respectively, to which the subscribes (1) are connected via a forward channel and a reverse channel and at least a SLAC (2, 2') (bidirectional analog-to-digital converter (CODEC) with subscriber interface circuits (SLIC) 31), and to which switching equipment (11) of the central office is connected via control circuits, wherein a regulating circuit 36 is arranged between every subscriber (1) and the SLAC (2) associated with the subscriber (1), and wherein a coupler (37) connected to the forward channel and reverse channel, is arranged at the subscriber side of every SLAC (2) and connected with the regulating circuit (36) which is connected with a comparison circuit (35) for comparing the reference direct current with the actual direct current.

5. Information transmission system according to claim 4, wherein the regulating circuit (36) comprises a circuit (40) which detects the sign of the output signal of a comparator (35) connected upstream, a digital integrator (41) which is connected downstream of the the circuit (40), and a digital-to-analog converter (43).

6. Information transmission system according to claim 5 wherein the regulating circuit (36) comprises a digital filter (42) between the digital integrator (41) and the digital-to-analog converter (43).

7. Information transmission system according to claim 4 wherein the coupler (37) is a transformer (38) with an isolating capacitor (39).

8. Information transmission system according to claim 4 wherein the comparison circuit (35) is a differential circuit.

9. Information transmission system according to claim 4 wherein the comparison circuit (35) is a comparator.

10. Information transmission system according to claim 4 wherein the regulating circuit is at least partially integrated within the SLAC associated with the subscriber (1).

11. Information transmission system in which subscribers (1) can be connected with a central office via a line (7), a bidirectional multiplexer and demultiplexer (4, 4'), respectively, being connected at the central office end and at the subscriber end of the line via a modem circuit (5, 5'; 18, 18') which is likewise bidirectional and which modulates and demodulates the data corresponding to the intended transmission, and in which a bidirectional compressor circuit and decompressor circuit (3, 3'; 17, 17') are connectable to the multiplexer and demultiplexer (4, 4'), respectively, to which the subscribers (1) are connected via a forward channel and a reverse channel and at least a SLAC (2, 2') (bidirectional analog-to-digital converter (CODEC) with subscriber interface circuits (SLIC) 31), and to which switching equipment (11) of the central office is connected via control circuits, wherein a circuit (33, 34, 36, 37, 38) is arranged between every subscriber (1) and the SLAC (2) associated with the subscriber (1), and wherein integrated in every SLAC (2) is at least one component selected from the group consisting of current meter and voltage meter.

12. Information transmission system according to claim 11 wherein the circuit between every subscriber and the SLAC is at least partially integrated within the SLAC associated with the subscriber (1).

* * * * *

UNITED STATES PATENT AND TRADEMARK OFFICE
CERTIFICATE OF CORRECTION

PATENT NO. : 5,629,931
DATED : May 13, 1997
INVENTOR(S) : Wilfried Kausel

It is certified that error appears in the above-identified patent and that said Letters Patent is hereby corrected as shown below:

Claim 1, line 43, delete second occurrence of "circuit".

Signed and Sealed this

Thirtieth Day of December, 1997

Attest:

BRUCE LEHMAN

*Attesting Officer*        *Commissioner of Patents and Trademarks*